United States Patent
Rand et al.

(10) Patent No.: US 11,010,732 B2
(45) Date of Patent: May 18, 2021

(54) DISTRIBUTED RULES-BASED SYSTEM PAYMENT SYSTEMS AND METHODS

(71) Applicant: PayForward LLC, Valencia, CA (US)

(72) Inventors: Armando Rand, Valencia, CA (US);
James Saltmar, Valencia, CA (US);
Armen Santourian, Valencia, CA (US);
Ronnie Silos, Valencia, CA (US)

(73) Assignee: PayForward LLC, Valencia, CA (US)

(*) Notice: Subject to any disclaimer, the term of this patent is extended or adjusted under 35 U.S.C. 154(b) by 354 days.

(21) Appl. No.: 15/650,610

(22) Filed: Jul. 14, 2017

(65) Prior Publication Data

US 2018/0018645 A1 Jan. 18, 2018

Related U.S. Application Data

(60) Provisional application No. 62/362,730, filed on Jul. 15, 2016.

(51) Int. Cl.
*G06Q 20/10* (2012.01)
*G06Q 20/38* (2012.01)
(Continued)

(52) U.S. Cl.
CPC .......... *G06Q 20/10* (2013.01); *G06Q 20/027* (2013.01); *G06Q 20/34* (2013.01); *G06Q 20/351* (2013.01);
(Continued)

(58) Field of Classification Search
CPC ...... G06Q 20/10; G06Q 20/02; G06Q 20/351; G06Q 20/36
See application file for complete search history.

(56) References Cited

U.S. PATENT DOCUMENTS 8,630,898 B1 1/2014 Knackstedt
8,682,784 B2 * 3/2014 Schleicher ............ G06Q 20/02
705/21
(Continued)

FOREIGN PATENT DOCUMENTS

EP 1675080 6/2006
WO 2010135642 11/2010

OTHER PUBLICATIONS

Social Finance Ltd. (https://en.wikipedia.org/wiki/Social_Finance_Ltd.), (Year: 2018).
(Continued)

*Primary Examiner* — Robert R Niquette
(74) *Attorney, Agent, or Firm* — Sheppard, Mullin, Richter & Hampton LLP

(57) ABSTRACT

The present disclosure provides systems and methods directed to processing payments using an event-triggered distributed rules-based system ("DRBS"). In one embodiment, a system comprises a DRBS comprising a DRBS virtual holding account associated with the DRBS, a merchant virtual account associated with a merchant, the merchant being a member of the DRBS, and/or a consumer virtual account associated with a consumer. The system also comprises a database configured to manage virtual balance information for the plurality of virtual accounts. The DRBS is configured to receive payment information associated with a payment transaction of the consumer at the merchant, receive funds from a consumer financial account associated with the consumer into a DRBS financial account associated with the DRBS, credit virtual funds to the DRBS virtual holding account or the consumer virtual account, transfer the virtual funds to the merchant virtual account, and transfer the funds from the DRBS financial account to a merchant financial account associated with the merchant.

19 Claims, 11 Drawing Sheets

(51) Int. Cl.
    *G06Q 20/02* (2012.01)
    *G06Q 20/34* (2012.01)
    *G06Q 20/36* (2012.01)
(52) U.S. Cl.
    CPC ....... *G06Q 20/3672* (2013.01); *G06Q 20/389* (2013.01)

(56) References Cited

U.S. PATENT DOCUMENTS

| | | | | |
|---|---|---|---|---|
| 8,751,380 | B2* | 6/2014 | Harvey | G06Q 10/00 705/39 |
| 8,892,474 | B1* | 11/2014 | Inskeep | G06Q 20/3674 705/44 |
| 2002/0022966 | A1* | 2/2002 | Horgan | G06Q 20/342 705/35 |
| 2005/0021455 | A1* | 1/2005 | Webster | G06Q 20/24 705/39 |
| 2005/0240477 | A1 | 10/2005 | Friday | |
| 2005/0269396 | A1 | 12/2005 | Schofield | |
| 2006/0036541 | A1* | 2/2006 | Schleicher | G06Q 20/02 705/39 |
| 2007/0061206 | A1 | 3/2007 | LeFebvre | |
| 2007/0118475 | A1 | 5/2007 | Picciallo | |
| 2007/0214080 | A1* | 9/2007 | Babi | G06Q 30/06 705/39 |
| 2008/0070690 | A1 | 3/2008 | Van Luchene | |
| 2009/0287563 | A1 | 11/2009 | Mone | |
| 2012/0095909 | A1* | 4/2012 | Resnick | G06Q 20/204 705/39 |
| 2012/0185318 | A1 | 7/2012 | Shipley | |
| 2013/0275300 | A1* | 10/2013 | Killian | G06Q 20/349 705/41 |
| 2013/0325604 | A1 | 12/2013 | Yeri | |
| 2014/0032294 | A1 | 1/2014 | Donlan | |
| 2014/0040001 | A1* | 2/2014 | Harvey | G06Q 10/00 705/14.26 |
| 2014/0195436 | A1* | 7/2014 | Schleicher | G06Q 20/02 705/44 |
| 2014/0289126 | A1* | 9/2014 | Harvey | G06Q 20/405 705/44 |
| 2014/0379562 | A1* | 12/2014 | Olson | G06Q 20/10 705/39 |
| 2018/0018645 | A1* | 1/2018 | Rand | G06Q 20/027 |

OTHER PUBLICATIONS

Social Finance: A Primer (https://www.americanprogress.org/issues/economy/reports/2013/11/05/78792/social-finance-a-primer/). (Year 2013).

Federal Reserve Bank of Kansas City. Consumer Payment Innovation in the Connected Age. (Mar. 29-30, 2012). Retrieved online Jan. 16, 2019. https://www.kansascityfed.org/publicat/pscp/2012/complete-proceedings.pdf (Year: 2012).

Reserve Bank of India. Report of the Group on Enabling PKI in Payment System Applications. (Apr. 22, 2014). Retrieved online Jan. 16, 2019. https://m.rbi.org.in/scripts/PublicationReportDetails.aspx?UrlPage=&ID=765 (Year: 2014).

* cited by examiner

DISTRIBUTED RULES-BASED SYSTEM PAYMENT SYSTEMS AND METHODS

CROSS-REFERENCE TO RELATED APPLICATIONS

This application claims priority to U.S. Provisional Application No. 62/362,730, filed Jul. 15, 2016 and entitled "DISTRIBUTED RULES-BASED SYSTEM PAYMENT SYSTEMS AND METHODS," which is hereby incorporated by reference in its entirety as if fully set forth herein.

TECHNICAL FIELD

The present disclosure relates generally to systems and methods for processing payments via an event-triggered distributed rules-based system.

BACKGROUND

The use of payment cards, such as credit and debit cards, has become ubiquitous. Generally, when a consumer makes a purchase at a merchant using a payment card, funds are transferred from an issuing bank with which the consumer has an account (e.g., a bank account or a line of credit), to an acquiring bank with which the merchant has an account. The purchase transaction generally results in various fees being assessed on the transaction. These fees can include fees collected by the issuing bank as well as fees collected by the acquiring bank. It is often the case that these interchange fees include both fixed, per-transaction fees as well as variable fees based on a percentage of the transaction amount.

SUMMARY OF THE INVENTION

In a first embodiment, the present invention may be embodied in a system comprising an event-triggered distributed rules-based system ("DRBS") comprising a DRBS virtual holding account associated with the DRBS, a merchant virtual account associated with a merchant, the merchant being a member of the DRBS, and/or a consumer virtual account associated with a consumer. The system also comprises a database configured to manage virtual balance information for the plurality of virtual accounts. The DRBS is configured to receive payment information associated with a payment transaction of the consumer at the merchant, receive funds from an external consumer financial account associated with the consumer into a DRBS financial account associated with the DRBS, credit virtual funds to the DRBS virtual holding account or the consumer virtual account, transfer the virtual funds to the merchant virtual account, and transfer the funds from the DRBS financial account to a merchant financial account associated with the merchant.

In another embodiment, the funds from the external consumer financial account associated with the consumer can be credited directly to a consumer virtual account on the DRBS associated with the consumer. The credited funds can then be transferred and credited to the merchant virtual account on the DRBS before being transferred to the merchant financial account associated with the merchant.

In an embodiment, the DRBS is configured to transfer the funds to the merchant financial account via an ACH transaction.

In an embodiment, the DRBS is further configured to transfer the credited funds from the DRBS virtual holding account or the consumer virtual account to the merchant virtual account once the funds received from the consumer financial account are available in a DRBS financial account.

In an embodiment, the DRBS is configured to credit the funds to the DRBS virtual holding account or the consumer virtual account and transfer the credited funds to the merchant virtual account by instructing a transaction processor to update the balance information in the database.

In an embodiment, the DRBS is further configured to debit the credited funds from the merchant virtual account in conjunction with the transferring the funds to the merchant financial account.

In an embodiment, the DRBS is further configured to aggregate a plurality of payment funds associated with a plurality of payments received by the merchant from a plurality of payment transactions occurring during a settlement period; and transfer the plurality of payment funds aggregated over the settlement period to the merchant financial account after the settlement period has closed.

In an embodiment, the DRBS is further configured to: receive a secure token associated with a stored payment method, and transmit the secure token to a payment processor, wherein the receiving the payment information comprises receiving stored payment information associated with the stored payment method in response to the transmitting the secure token to the payment processor.

In an embodiment, the DRBS is further configured to: receive consumer refund information, debit the merchant virtual account based on the consumer refund information, and receive funds from the merchant financial account based on the debiting the merchant virtual account.

In an embodiment, the funds are received from the consumer financial account via a Visa Direct Original Credit Transaction (OCT) process.

In an embodiment, the funds are received from the consumer financial account via an intra-network credit transaction processed within the DRBS.

In an embodiment, the DRBS is further configured to: receive a recurring payments file containing a plurality of recurring payment transactions, each recurring payment transaction comprising payment information and associated with a consumer, and, for each recurring payment transaction of the plurality of recurring payment transactions: receive funds for the recurring payment transaction, credit the funds to the DRBS virtual holding account or the consumer virtual account, transfer the credited funds to the merchant virtual account, and transfer the funds to the merchant financial account associated with the merchant.

In an embodiment, the DRBS is further configured to aggregate the funds from the plurality of recurring payment transactions, and transfer the aggregated funds to the merchant financial account in a single ACH transaction.

The present disclosure may also be embodied in a method comprising: receiving payment information associated with a payment transaction of a consumer at a merchant; receiving funds from a consumer financial account associated with the consumer, crediting the funds to a DRBS virtual holding account or a consumer virtual account, transferring the credited funds to a merchant virtual account, and transferring the funds to a merchant financial account associated with the merchant.

The present disclosure may also be embodied in a method comprising: receiving transaction information for a plurality of transactions associated with a merchant; receiving funds from a plurality of consumer financial accounts based on the transaction information; crediting the funds to a DRBS virtual holding account and/or one or more consumer virtual accounts; transferring the credited funds to a merchant virtual account; and in response to the closing of a settlement period, transferring the funds to a merchant financial account associated with the merchant.

Although various combinations of limitations have been disclosed with respect to each of the systems and methods described above, it should be appreciated that these do not constitute every limitation disclosed herein nor do they constitute every possible combination of limitations. As such, it should be appreciated that additional limitations and different combinations of limitations presented within this disclosure remain within the scope of the disclosed invention.

These and other features and advantages of the invention should become more readily apparent from the detailed description of the preferred embodiments set forth below taken in conjunction with the accompanying drawings, which illustrate, by way of example, the principles of the invention.

BRIEF DESCRIPTION OF THE DRAWINGS

The drawings are provided for purposes of illustration only and merely depict typical or example implementations. These drawings are provided to facilitate the reader's understanding and shall not be considered limiting of the breadth, scope, or applicability of the disclosure. For clarity and ease of illustration, these drawings are not necessarily drawn to scale.

DETAILED DESCRIPTION OF VARIOUS EMBODIMENTS

Figure 1:
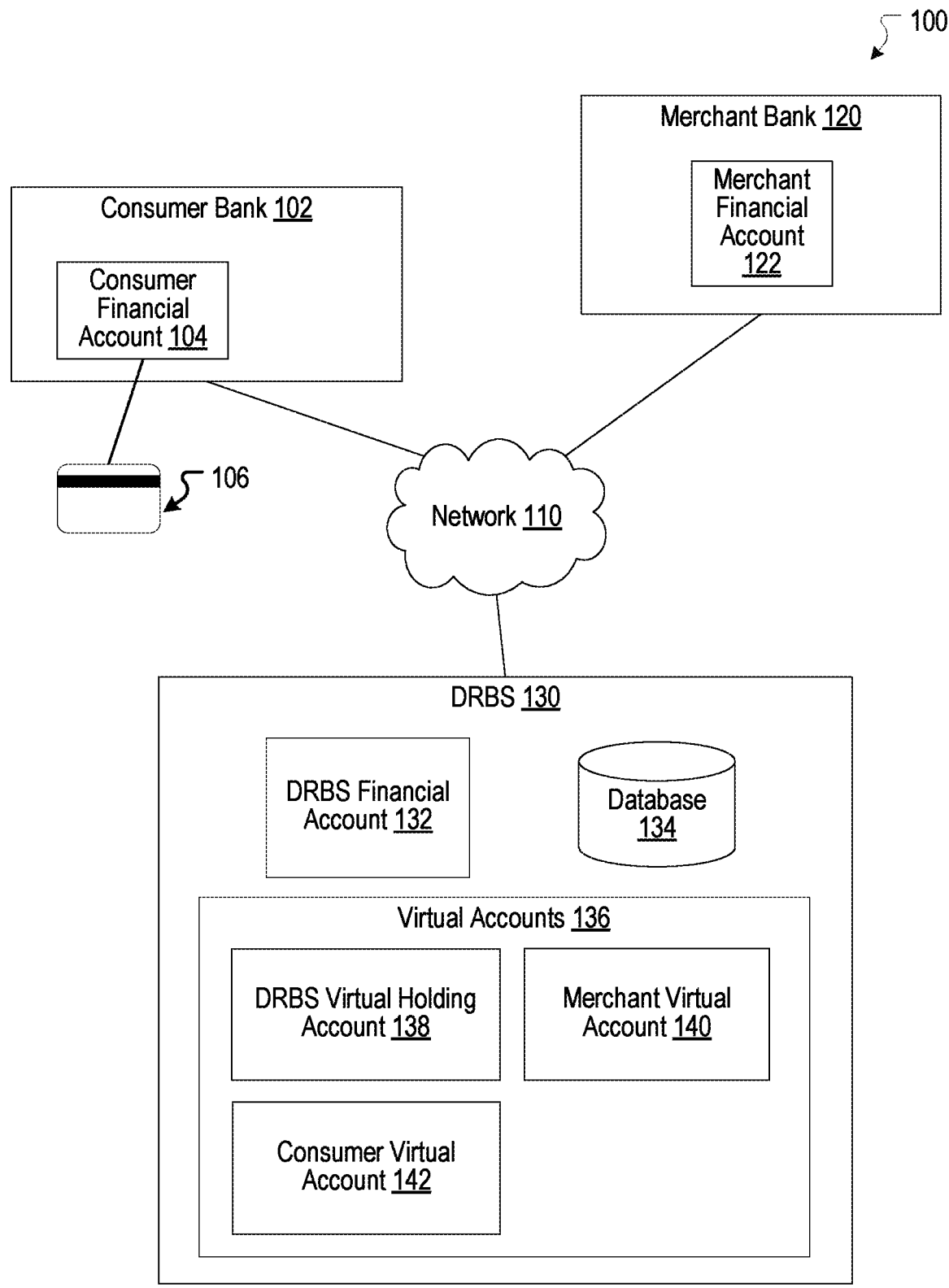
FIG. 1 provides an example financial system that can be utilized to carry out various financial transactions, in accordance with an embodiment of the present disclosure.

The use of payment cards, such as credit and debit cards, has become ubiquitous. Generally, when a consumer makes a purchase at a merchant using a payment card, funds are transferred from an issuing bank with which the consumer has an account (e.g., a bank account or a credit line account), to an acquiring bank with which the merchant has an account. The purchase transaction generally results in various fees being assessed on the transaction. These fees can include fees collected by the issuing bank as well as fees collected by the acquiring bank. It is often the case that these interchange fees include both fixed, per-transaction fees, as well as variable fees based on a percentage of the transaction amount.

Transaction interchange fees are generally paid by the merchant. As such, it can be appreciated that merchants would prefer payment systems with lower fees if possible. Furthermore, high interchange fees can affect the prices consumers pay for goods and services. Therefore, even if consumers are not directly paying the interchange fees charged for purchase transactions, high fees can be detrimental to consumers as well. It continues to be an important interest for merchants and financial institutions to devise systems that are profitable while also maintaining low fees. Maintaining low fees can encourage users to use payment cards to make purchases, and can also encourage greater numbers of purchase transactions.

An improved approach rooted in computer technology overcomes the foregoing and other disadvantages associated with conventional approaches specifically arising in the realm of computer technology. Based on computer technology, the disclosed technology can decrease transaction fees charged on payment card transactions through the use of an event-triggered distributed rules-based system ("DRBS"). Under current fee structures and payment schemes, non-purchase transactions, such as card-to-card transfers, are generally assessed lower fees than traditional payment card purchase transactions. The disclosed systems and methods utilize a DRBS comprising a plurality of user accounts to carry out non-purchase transfers in lieu of traditional purchase transactions, taking advantage of the lower fees assessed to these non-purchase transfers. For example, the DRBS can comprise a plurality of user accounts, including one or more accounts associated with one or more merchants. When a consumer initiates a payment card purchase transaction with a merchant that has an account on the DRBS, the payment is first directed to the DRBS, e.g., to a general-purpose reloadable (GPR) financial account associated with the DRBS. This transaction can be processed by the various financial institutions involved as an account-to-account or card-to-card, non-purchase transfer, as the DRBS is not a merchant that has made a sale. The DRBS can be configured to keep an accounting of all transactions for the merchant during a settlement period. For example, a virtual account on the DRBS associated with the merchant can have a balance that is updated with each incoming payment. The DRBS can then transfer appropriate funds from its own financial account to the merchant's financial account (e.g., a bank account) in a single ACH transaction at the close of the settlement period. These concepts will be described in greater detail below with reference to the figures and various examples.

In addition to lower transaction costs, the disclosed systems and methods can provide additional benefits compared to current payment platforms. For example, various embodiments of the presently disclosed systems and methods provide a technical solution for a consumer to make purchases with a merchant via the DRBS without having to register as a user of the DRBS. Many payment platforms require user registration based on various regulatory requirements, such as the Patriot Act. These regulatory requirements are sometimes referred to as "customer identification programs" (CIPS). These regulatory requirements require that financial institutions "know their customers" so as to help prevent illegal activities such as money laundering. When a payment platform houses funds for a customer, the payment platform must first identify the customer via a customer identification program. However, in various embodiments, the currently disclosed systems and methods can receive funds from a consumer financial institution (e.g., the consumer's bank) into a DRBS virtual holding account associated with the DRBS. Those funds are then transferred to a merchant virtual account on the DRBS. There is no consumer virtual account on the DRBS involved at all. As such, the DRBS never holds any funds on a consumer's behalf and there is no requirement for the consumer to register for an account on the DRBS. Only the merchant need register for an account with the DRBS.

Alternatively, in certain embodiments consumers can also register with the DRBS (for example, in order to participate in a cash rewards program). When a consumer registers with the DRBS, a consumer virtual account associated with the consumer can be created on the DRBS. In this case, CIP can be completed when a consumer registers and, therefore, funds may be transferred from the consumer's financial account (or from any other source) to the consumer virtual account on the DRBS.

From time to time, various embodiments of the technology are described with reference to simple examples. However, as will be apparent to one of ordinary skill in the art after reading this description, the technology described herein is not limited to application in these examples but can be applied in a number of different scenarios or applications. For example, while the example of payment cards will be used throughout the disclosure, it should be appreciated that the presently disclosed technology can be applied to any other payment token, including both physical and digital payment tokens.

FIG. 1 depicts an example system 100 that can be utilized to carry out various financial transactions. The system 100 includes a consumer bank 102 housing a consumer financial account 104, and a merchant bank 120 housing a merchant financial account 122. The consumer bank 102 and the merchant bank 120 are connected over a financial network 110. It should be noted that, although the example system 100 depicts the consumer bank 102 and the merchant bank 120 as separate blocks, it is possible that the consumer bank 102 and the merchant bank 120 could be a single entity. For example, if the consumer and the merchant have bank accounts at the same bank or financial institution.

The consumer financial account 104 is associated with a payment card 106. When a consumer makes a purchase using the payment card 106, funds are withdrawn from the associated consumer financial account 104. In a conventional purchase transaction in which a consumer makes a purchase at a merchant using the payment card 106, the consumer bank 102, acting as an "issuing bank," transfers funds to the merchant bank 120, acting as an "acquiring bank." Funds are debited from the consumer financial account 104 and deposited into the merchant financial account 122. In carrying out this transaction, both the issuing bank (the consumer bank 102) and the acquiring bank (merchant bank 120) can charge various transaction fees, including fixed transaction fees (e.g., a fixed amount per transaction), and variable fees based on the amount of the transaction (e.g., a certain percentage of the transaction amount).

The system 100 also includes a DRBS 130. In certain embodiments, the DRBS 130 may comprise a monolithic account structure comprising a plurality of users, which may be classified in one or more classes, e.g., consumers and merchants. Each user may have a virtual financial account set up within the monolithic account structure representing the amount of money the user has within the DRBS. Any money deposited into the DRBS's monolithic account structure by users may be housed in one or more banks internationally under the DRBS's bank accounts. For example, the DRBS 130 includes a DRBS financial account 132 associated with the DRBS 130. The DRBS, or an external transaction processor, may keep track of the virtual accounts, i.e., keep track of how much of the money housed in the DRBS's bank account belongs to each user. In certain embodiments, this may be accomplished by a database 134 in which user account information, identifying individual users, is associated with virtual balance information indicating the amount of money in that user's virtual account. As money is transferred into or out of each user's virtual account, the database is updated to increase or decrease the virtual balance information as necessary. Various exemplary embodiments of a DRBS are disclosed in U.S. patent application Ser. No. 14/713,924, filed May 15, 2015, and entitled "Social-Financial Network Systems and Methods," the entirety of which is incorporated by reference, as if fully set forth herein.

As discussed above, the DRBS 130 comprises a plurality of virtual user accounts 136 associated with a plurality of users. Each virtual account comprises a virtual budget, which is indicative of the amount of money that belongs to the user within the DRBS. As such, while all funds contained within the social financial network are housed in financial accounts within the DRBS (e.g., the DRBS financial account 132), an individual user's virtual account balance is indicative of how much of the total funds belong to that individual user. In order to take funds and use them outside of the DRBS, a user can, for example, take various actions to cause all or part of his or her virtual balance to be transferred from the DRBS financial account 132 to the user's own financial account (e.g., consumer financial account 104 or merchant financial account 122).

In the example system 100, three virtual accounts are depicted: a DRBS virtual holding account 138, a merchant virtual account 140, and a consumer virtual account 142. The DRBS virtual holding account 138 is a virtual account on the DRBS 130 associated with the DRBS itself, the merchant virtual account 140 is a virtual account on the DRBS associated with a merchant, and the consumer virtual account 142 is a virtual account on the DRBS 130 associated with a consumer. As will be described in greater detail below, the presently disclosed systems and methods take advantage of lower fees associated with non-purchase financial transfers. An example of non-purchase financial transfers includes Visa's account funding transaction (AFT) (for pulling funds from a user account) and original credit transaction (OCT) (for pushing funds into a user account). Another example of non-purchase financial transfers can include an intra-network transaction for internally crediting a user's virtual account with no associated transaction costs imposed by card networks, issuing banks, or acquiring banks.

In certain embodiments, when the consumer associated with the consumer financial account 104 makes a purchase with the merchant associated with the merchant financial account 122 using the payment card 106, funds are transferred first to the DRBS 130, rather than being transferred directly to the merchant. Funds are transferred from the consumer financial account 104 to the DRBS financial account 132. These funds now reside on the DRBS, since they are stored in the DRBS's financial account, and the merchant's virtual account balance is updated to indicate that the merchant is entitled to those funds.

In certain embodiments, the funds transferred from the consumer financial account 104 to the DRBS financial account 132 are virtually credited first to the DRBS virtual holding account 138, before being transferred within the DRBS 130 to the merchant virtual account 140. For example, the funds can be temporarily held in the DRBS virtual holding account 138 until the funds have been made available in the DRBS financial account 132 (e.g., once processing delays or holds have completed). Once the funds have been made available in the DRBS financial account 132, the virtual funds can be transferred from the DRBS virtual holding account 138 to the merchant virtual account 140.

In certain other embodiments, the funds transferred from the consumer financial account 104 to the DRBS financial account 132 are credited first to the consumer virtual account 142, before being transferred within the DRBS 130 to the merchant virtual account 140. In various embodiments, the funds can be temporarily held in the merchant virtual account 140 until the funds have been made available in the DRBS financial account 132 (e.g., once processing delays or holds have completed). Once the funds have been made available in the DRBS financial account 132, the funds can be transferred from the DRBS financial account 132 to the merchant financial account 122. Correspondingly, when funds are transferred to the merchant financial account 122, the virtual funds that were credited to the merchant virtual account 140 can be deducted from the merchant virtual account 140.

The merchant's virtual account 140 can be continuously updated during a settlement period to indicate the merchant's current balance. At the close of the settlement period, all transactions and credited funds for the merchant accumulated during the settlement period can be transferred from the DRBS financial account 132 to the merchant financial account 122, for example, via an ACH transaction. Once the actual funds have been transferred from the DRBS financial account 132 to the merchant financial account 122, the merchant's virtual account 140 can be debited accordingly. The specific mechanisms and procedures utilized to carry out this transaction are described in greater detail below with reference to the various figures and various example scenarios associated therewith.

Figure 2A:
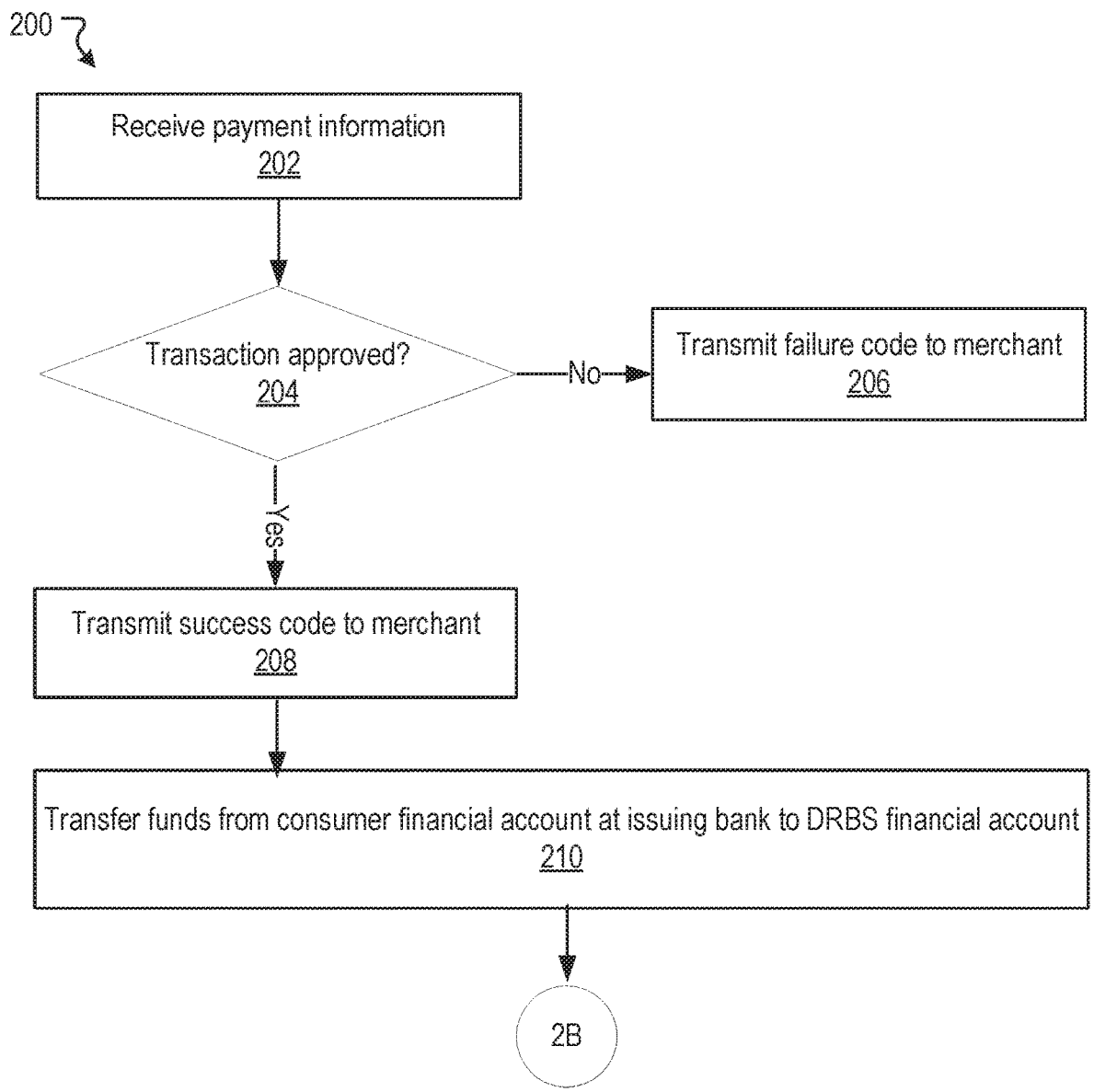
FIGS. 2A and 2B provide a flow chart of an example method associated with processing a payment, in accordance with an embodiment of the present disclosure.
Figure 2B:
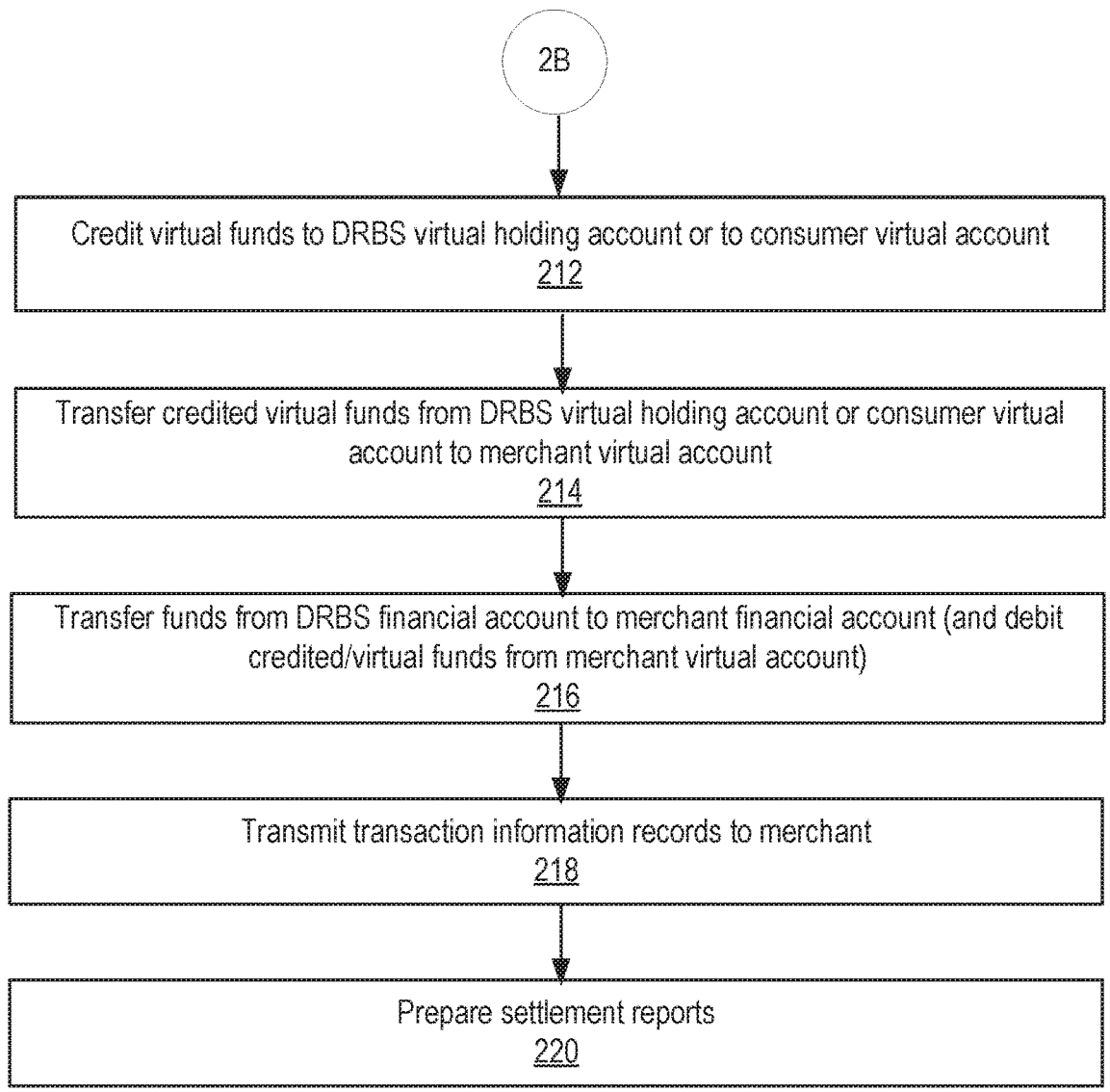

FIGS. 2A-B provide a flowchart of an exemplary transaction processing method 200. The example method 200 is associated with processing a payment from a consumer. At block 202, payment information is received from the consumer. Payment information can include consumer identifying information (e.g., name, address, user ID, account number, etc.) and payment card information (e.g., card number, billing address, security code, etc.). Payment information can also include any other relevant payment information, such as payment amount, and merchant identifying information (which can be utilized by the DRBS to identify who the payment is directed to). In certain embodiments, merchant identifying information can also include "batch" information which identifies a particular division or "batch" associated with a merchant (e.g., a particular line of business, or particular grouping of customers), as will be discussed in greater detail below.

At block 204, a determination is made as to whether or not the transaction is approved. This may comprise transmitting at least a subset of the payment information to a card network (e.g., Visa or MasterCard) to determine whether or not the payment is authorized. The DRBS can, for example, contact the issuing bank associated with the payment card to determine whether the consumer has sufficient funds to complete the transaction. In another example, the card network or the issuing bank may determine whether the card has been reported as stolen or lost, or whether the transaction is potentially fraudulent. If the transaction is not approved, a failure code is transmitted to the merchant at block 206.

If the transaction is approved, a success code is transmitted to the merchant (block 208). At block 210, funds are transferred from the consumer financial account (e.g., at the issuing bank) to a DRBS financial account (e.g., at the DRBS's bank).

The example method 200 is continued in FIG. 2B. Once the funds transfer to the DRBS's financial account has been initiated, a virtual account on the DRBS can be credited with those funds. In one embodiment, the funds can first be credited to a DRBS virtual holding account (block 212), such as the DRBS virtual holding account 138 of FIG. 1. In another embodiment, the funds can be credited to a consumer virtual account, such as the consumer virtual account 142 of FIG. 1. By transferring funds first to the DRBS virtual holding account or the consumer virtual account, the consumer is transferring funds to the DRBS, rather than to the merchant, thereby qualifying the transaction for card-to-card or other non-purchase transfer fees, rather than higher purchase interchange fees usually charged by financial institutions.

At block 214, credited, virtual funds are transferred from the DRBS virtual holding account or the consumer virtual account to a merchant virtual account on the DRBS. In certain embodiments, virtual funds can be transferred from the DRBS virtual holding account to the merchant virtual account once the transfer from the consumer financial account to the DRBS financial account has completed and the funds have become available.

In certain embodiments, the DRBS, or an external transaction processor, may keep track of virtual funds balances on virtual accounts on the DRBS. This can be accomplished, for example, utilizing a database in which user account information, identifying individual users, is associated with virtual balance information indicative of the amount of money in that user's virtual account. As virtual funds are transferred into or out of each user's virtual account, the database is updated to increase or decrease the virtual balance information as necessary.

If virtual account balance information is handled by a third-party transaction processor, the DRBS can add virtual funds to virtual accounts, transfer virtual funds between virtual accounts, and/or withdraw virtual funds from virtual accounts by transmitting a corresponding instruction to the transaction processor. The transaction processor's role, in the present example, is to keep track of how much money is contained in each user's virtual account, and to update virtual balance information with each transaction. In this embodiment, all funds contained within the DRBS's monolithic account structure are housed in one or more bank accounts associated with the DRBS. From the viewpoint of the banks housing these funds, the funds simply reside on the DRBS, and are not demarcated as belonging to one DRBS user or another. The transaction processor stores user information and user virtual balance information in one or more databases so that the DRBS can keep track of how much money each user has stored in the DRBS's monolithic account.

When virtual funds are in a merchant's (or other user's) virtual account on the DRBS, those funds belong to the merchant, and are available within the DRBS, but may not yet be available to the merchant outside the DRBS. In order to make those funds available outside the DRBS, funds can be transferred to the merchant's financial account (for example, the merchant's bank account) from a DRBS financial account. Returning to the example method 200, at block 216, funds are transferred from the DRBS financial account, such as the DRBS financial account 132 of FIG. 1, to a merchant financial account, such as the merchant financial account 122 of FIG. 1. These funds have been transferred to the merchant's actual bank account and, as such, can be debited from the merchant's virtual account.

In certain embodiments, the transfer from the DRBS's financial account to the merchant financial account can be carried out via an ACH transaction. Banks generally charge fees to carry out ACH transactions. In order to minimize such fees, and to minimize other transaction costs, multiple purchase transactions involving the merchant can be aggregated over a settlement period, and, at the end of the settlement period, a single ACH transaction can be carried out to transfer the aggregated payments over to the merchant financial account. For example, if the settlement period is defined as one day, all payments to a merchant made on a particular day can be accumulated in the merchant's virtual account, and at the end of the day, the accumulated payments can be transmitted to the merchant's financial account in a single ACH transaction.

In various embodiments, multiple purchase transactions can be aggregated into one or more "batches" based on merchant preferences. For example, a particular merchant may have multiple lines of business, or may group customers into various customer groups. In this scenario, the merchant may wish to aggregate all purchase transactions for a particular line of business or a particular customer group into a single batch payment (i.e., a single ACH transaction) such that multiple batch payments or ACH transactions are instituted, with each ACH transaction representing aggregated purchase transactions for a particular grouping (e.g., a line of business, or a customer group) based on merchant preferences.

At block 218, transaction information records are transmitted to the merchant for the merchant's records. The transaction information records can include all relevant details for the various transactions conducted during the settlement period. For example, if five different payments totaling $1500 were made to the merchant during the settlement period, the merchant may need to know which five consumers to credit for those transactions, the amount of each transaction, the date and time of each transaction, and any other relevant details regarding each transaction for its records. In furtherance of this, the transaction information records can include consumer information, payment amount information, and the like, so that the merchant is aware of the various transactions that have taken during the settlement period and can update its records accordingly, e.g., by crediting a payment to the various consumers who have remitted payment. At block 220, the DRBS can prepare settlement reports for its own records and to assist the merchant in payment reconciliation.

Tokenized Payments (Stored Payment Methods)

In certain embodiments, users may be provided with the option to store payment information for future use. For example, a user can enter payment information, and then store it as a stored payment method so that, for future transactions, the user can use the stored payment information rather than re-entering payment information for every transaction. If payment information is stored by the merchant, then the user can select a stored payment method, and the payment transaction can move forward much in the same way as it was discussed in FIGS. 2A-B.

However, for security purposes, it may be the case that merchants do not wish to store sensitive consumer payment information, and/or transmit the sensitive information with each payment. In these scenarios, merchants can utilize the services of third-party payment processors. Third-party payment processors can store the sensitive consumer payment information, so that merchants do not have to. When a consumer enters payment information, and requests that the payment information be stored for future use, the payment information can be provided to the third-party payment processor. The third-party payment processor can then generate a secure token associated with the stored payment method. The third-party payment processor can store the stored payment method (and the associated payment information provided by the consumer) along with the secure token, and provide the secure token to the merchant. The merchant can store the secure token and associate it with the stored payment method without actually storing the sensitive payment information. In this way, when a user selects a stored payment method for a future transaction, the merchant can identify the secure token associated with the stored payment method, transmit the secure token to the third-party payment processor, and then receive the payment information for the stored payment method from the third-party payment processor in order to carry out the transaction.

Figure 3A:
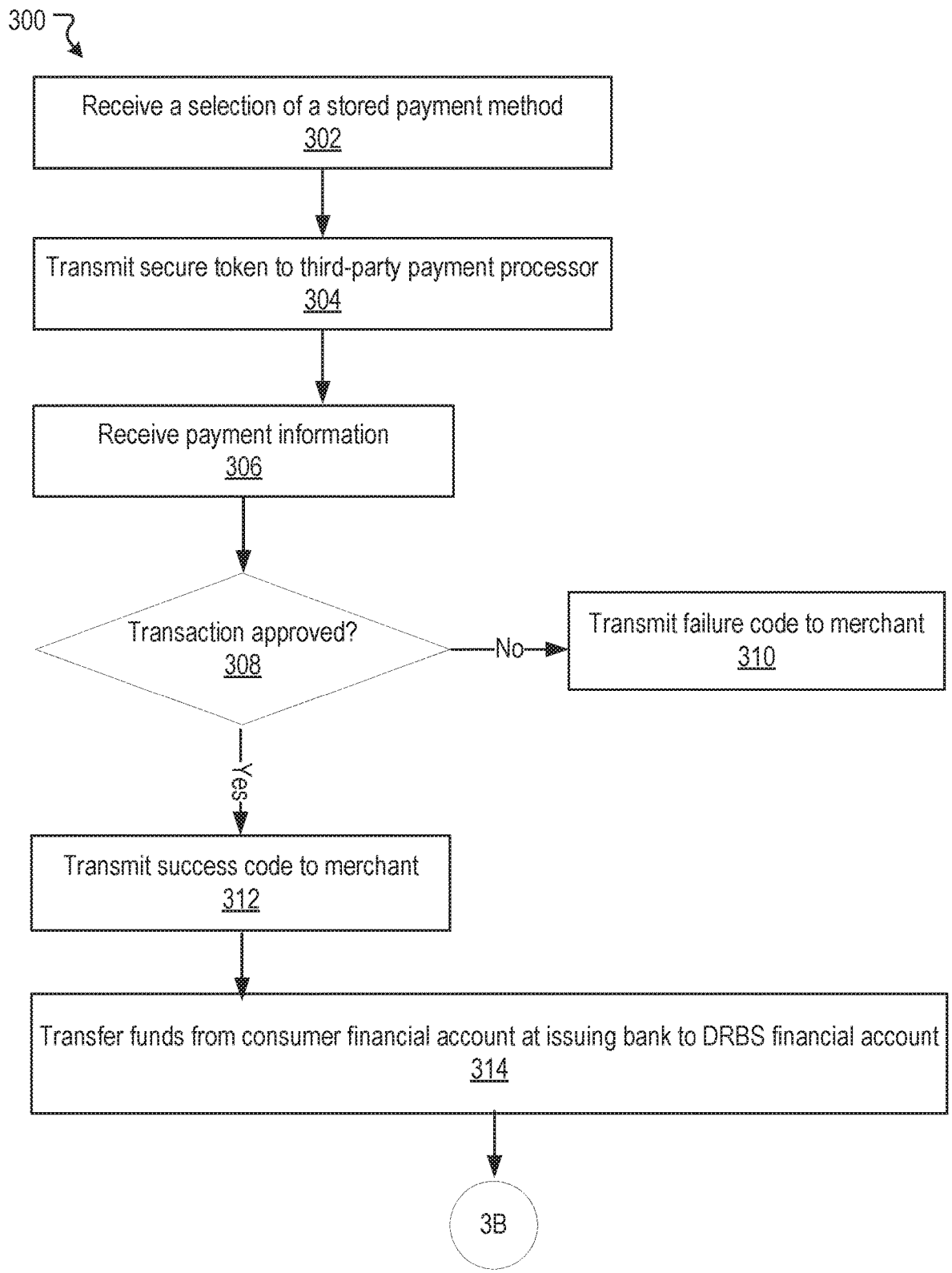
FIGS. 3A and 3B provide a flow chart of an example method associated with processing a tokenized payment using a stored payment method, in accordance with an embodiment of the present disclosure.
Figure 3B:
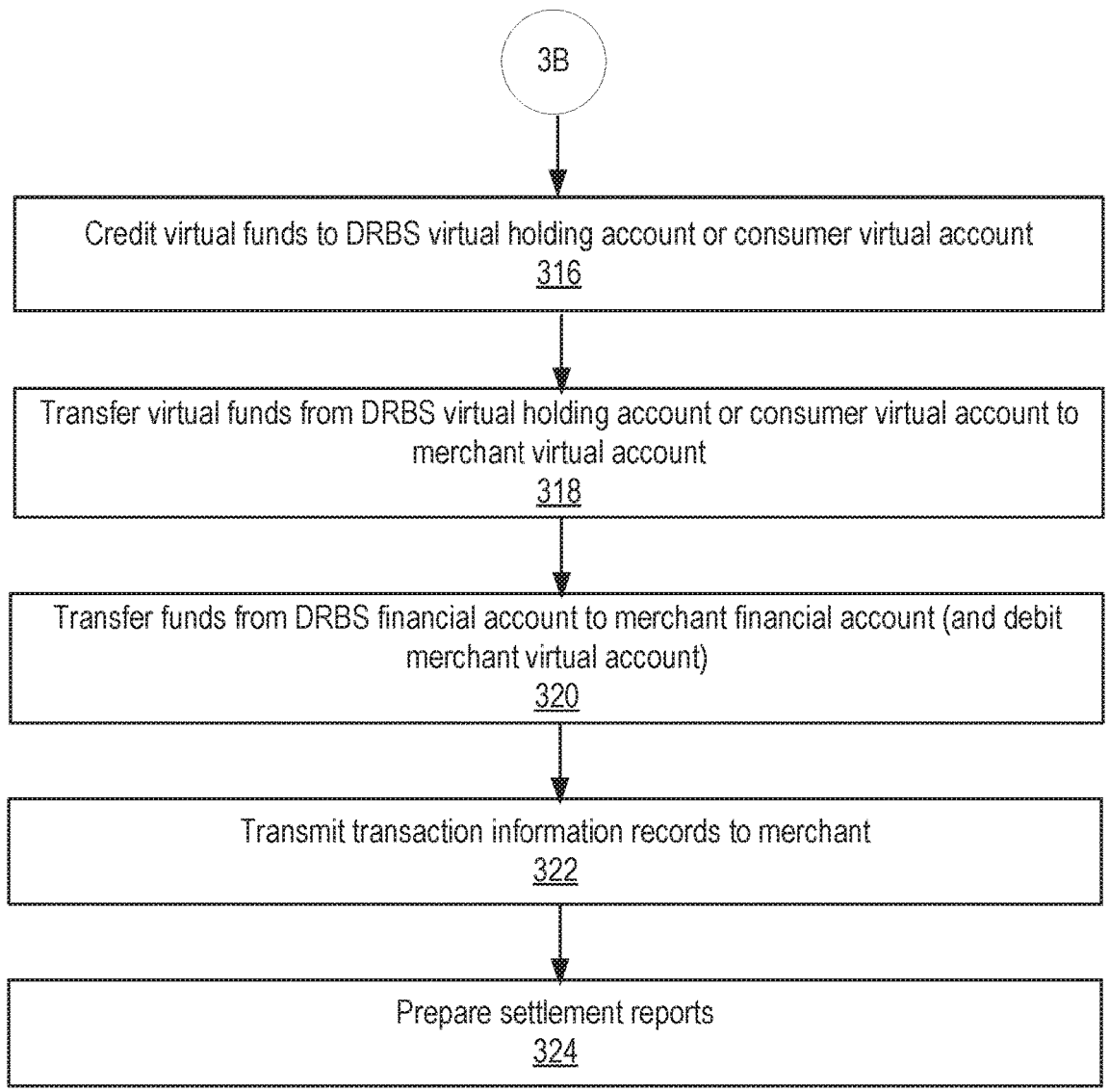

FIGS. 3A-B illustrate an example method 300 in which a consumer has opted to make a payment using a stored payment method. The method 300 is very similar to the method 200 of FIGS. 2A-B. However, rather than receiving payment information, for example, directly from a consumer, a secure token must first be provided to a third-party payment processor and then payment information received from the third-party payment processor.

At block 302, a selection of a stored payment method is received. In certain embodiments, this may comprise receiving a selection of a stored payment method from a user via a graphical user interface. In various embodiments, the user may have multiple payment methods stored, and may select a stored payment method from a plurality of stored payment methods. At block 304, a secure token associated with the selected stored payment method is transmitted to a third-party payment processor. The payment processor loads payment information associated with the secure token, and transmits it to the DRBS. At block 306, the DRBS receives payment information. The DRBS receives at least a portion of the payment information from the third-party payment processor. For example, the third-party payment processor may provide a credit card number that is associated with the secure token, while additional payment information (e.g., billing address or cardholder name) is provided by a merchant, or by a customer. Alternatively, the third-party payment processor may provide more complete payment information, such as the card number, customer name, billing address, etc. From this point on, the method 300 is generally identical to the method 200 of FIGS. 2A-B. At block 308, it is determined whether or not the transaction is approved. As discussed above, this may be performed by transmitting payment information to a card network so that the card network can determine whether or not the transaction is approved. If the transaction is not approved, a failure code is transmitted to the merchant (block 310), and if the transaction is approved, a success code is transmitted to the merchant (block 312). At block 314, funds are transferred from a consumer financial account at an issuing bank to a DRBS financial account (e.g., the DRBS's bank account). At block 316, virtual funds are credited to a DRBS virtual holding account or a consumer virtual account. It should be understood that while the figure depicts the transfer of funds from the consumer financial account to the DRBS financial account before the crediting of the DRBS virtual holding account or the consumer virtual account, the order of steps presented in the figure is exemplary, and need not be performed in exactly the same order. For example, actual transfer of funds from the consumer financial account to the DRBS financial account may be delayed by one or more business days after the transfer is initiated due to current banking procedures. It should be understood that the "transfer" of funds should be interpreted broadly, and can represent either initiation of transfer of funds, or actual transfer of funds. Furthermore, it may be the case that the crediting of a virtual account occurs before the actual transfer of funds from one financial account to another.

At block 318, virtual funds are transferred from the DRBS virtual holding account to a merchant virtual account. At block 320, funds are transferred from the DRBS financial account to a merchant financial account, and virtual funds are debited from the merchant virtual account. Transaction information is transmitted to the merchant for the merchant's records (block 322), and settlement reports are prepared for the DRBS's records (block 324).

Recurring Payments

In certain embodiments, consumers may wish to set up their account for automatic, recurring payments. For example, if a consumer has a monthly subscription, or has to pay a monthly bill for a service, the consumer may want the monthly payment completed automatically. The consumer can enter payment information, and the payment information can be stored such that, every month, a payment from the consumer to the merchant is automatically processed using the stored payment information. In such an embodiment, payments can be carried out for individual accounts automatically using stored payment information in a manner very similar to that described above with reference to FIGS. 3A-B. Rather than receiving a stored payment method selection, a default stored payment method can be automatically selected, and then the various payment steps can proceed.

In other embodiments, a merchant may prepare a file identifying one or more recurring payments to be processed at a particular time. For example, on any given day, the merchant may have a file listing all automatic, recurring payments to be processed on that day. The file can include all relevant information necessary to process the automatic recurring payments, such as consumer information identifying a consumer associated with each automatic recurring payment (e.g., consumer name, member ID, address, etc.), payment information (e.g., payment amount, secure token to be used for payment, and/or payment information, etc.), and the like. The file can be transmitted to the DRBS for automatic processing of recurring payments.

Figure 4A:
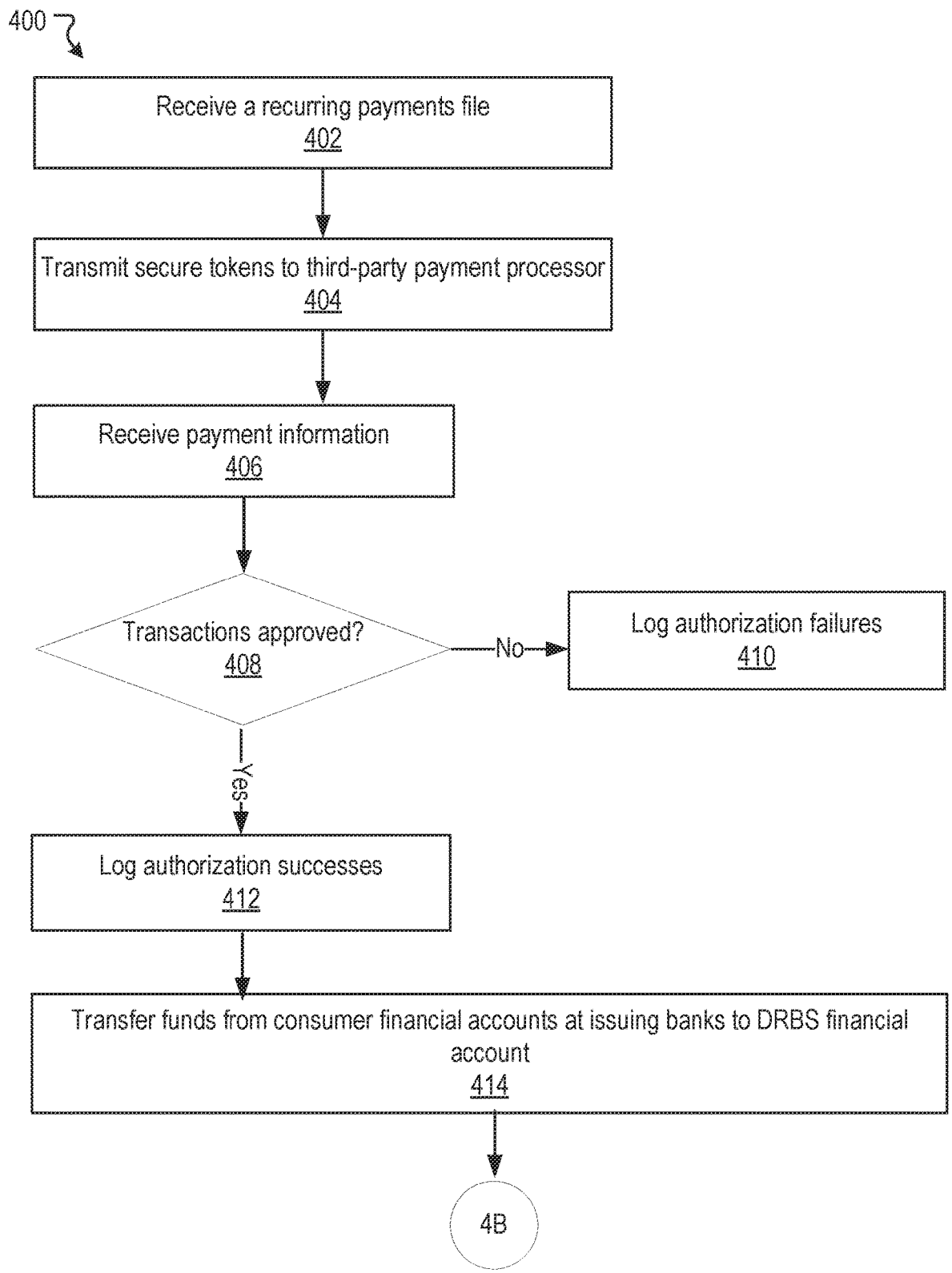
FIGS. 4A and 4B provide a flow chart of an example method associated with processing recurring payments, in accordance with an embodiment of the present disclosure.
Figure 4B:
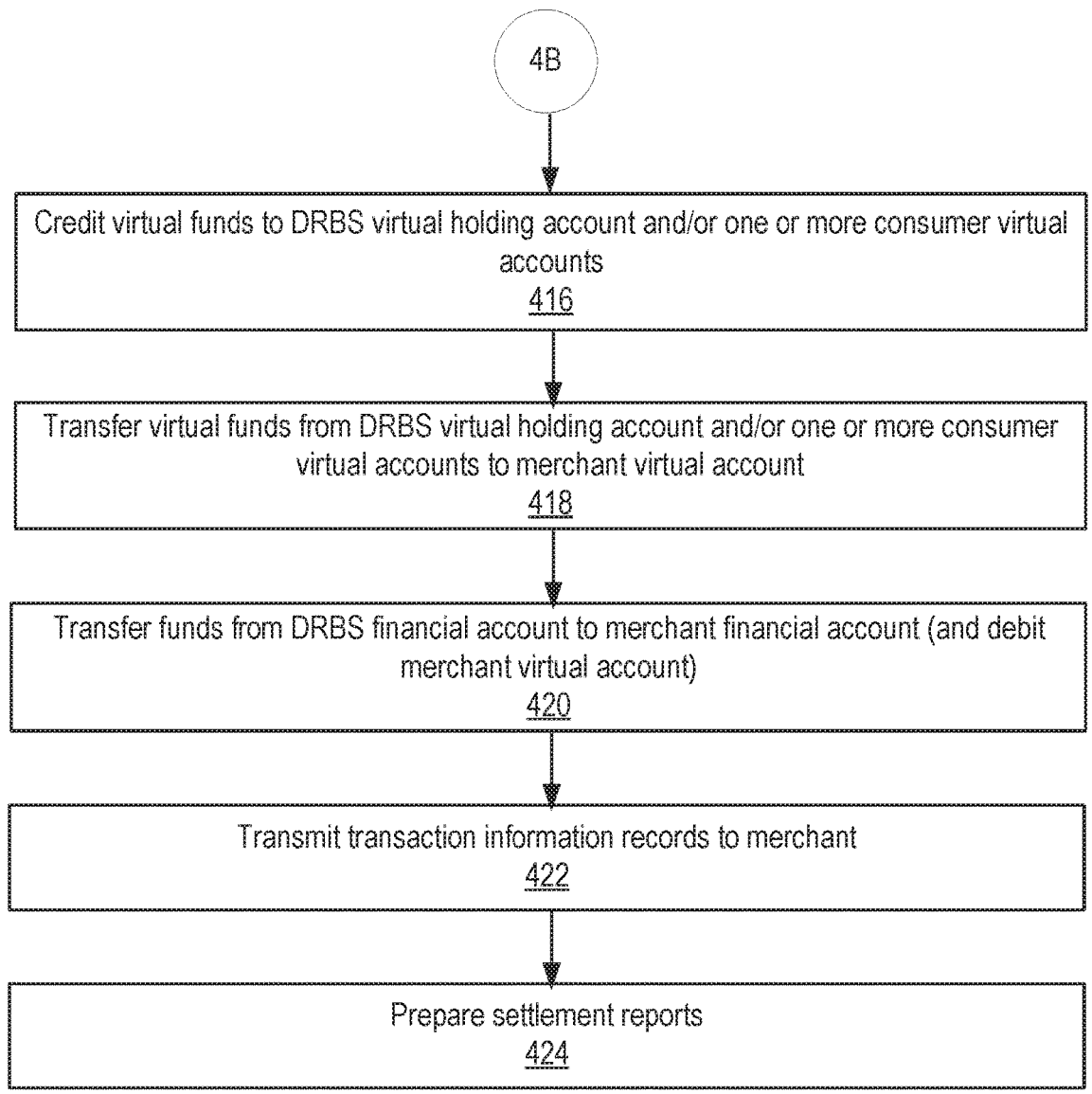

FIGS. 4A-B illustrate an example method 400 associated with processing one or more automatic payments based on a recurring payments file. At block 402, a recurring payments file is received. The recurring payments file can include payment information for one or more recurring payments (e.g., consumer information, payment card information and/or secure token information, payment amount information, etc.). In the example method 400, each recurring payment includes secure token information for loading a stored payment method for each recurring payment. At block 404, secure token information for the one or more secure tokens are transmitted to a third-party payment processor. At block 406, payment information is received. In certain embodiments, at least a portion of the payment information can be received from a third-party payment processor based on secure token information. The payment information received from the third-party payment processor may represent complete payment information (e.g., all payment information necessary to process a payment), or partial payment information (e.g., just a credit card number). If the payment information from the third-party payment processor is partial payment information, then the remainder of the payment information necessary to process a payment can be received from another source, e.g., the merchant. The payment information can include stored payment information for a plurality of consumers, e.g., a plurality of consumers identified in the recurring payments file. At block 408, each of the recurring payments is analyzed for transaction approval. If a transaction is not approved for any reason (e.g., insufficient funds, payment card marked as stolen, potentially fraudulent transaction or rejected transaction), it is logged as a failed transaction in a transaction log (block 410). If a transaction is approved, it is logged as an authorized transaction in the transaction log (block 412). In certain embodiments, only authorization failures are logged, or authorization failures and authorization successes can be logged in separate transaction logs, or in a single log.

At block 414, funds from all authorized transactions are transferred from various consumer financial accounts at various issuing banks to a DRBS financial account. At block 416, virtual funds are credited to a DRBS virtual holding account and/or one or more consumer virtual accounts. At block 418, virtual funds from the DRBS virtual holding account and/or the one or more consumer virtual accounts are transferred to a merchant virtual account. In certain embodiments, virtual transfer of funds from the DRBS virtual holding account and/or the one or more consumer virtual accounts to the merchant virtual account may happen in a single transfer. For example, once all funds transfers from the various consumer financial accounts at various issuing banks become available in the DRBS financial account, the aggregated total can be transferred from the DRBS virtual holding account and/or the one or more consumer virtual accounts to the merchant virtual account. Alternatively, the virtual transfer may occur in multiple transfers, e.g., transferring virtual funds from the DRBS virtual holding account and/or the one or more consumer virtual accounts to the merchant virtual account as each transfer from each consumer financial account becomes available in the DRBS financial account.

At block 420, funds are transferred from the DRBS financial account to a merchant financial account, and virtual funds are appropriately debited from the merchant virtual account. At block 422, transaction information records are transmitted to the merchant for the merchant's records. In this embodiment, the transaction information records can include the transaction log(s) indicating which recurring payments could not be processed due to authorization failures. At block 424, settlement reports are prepared for the DRBS's records.

Payment Returns

Figure 5:
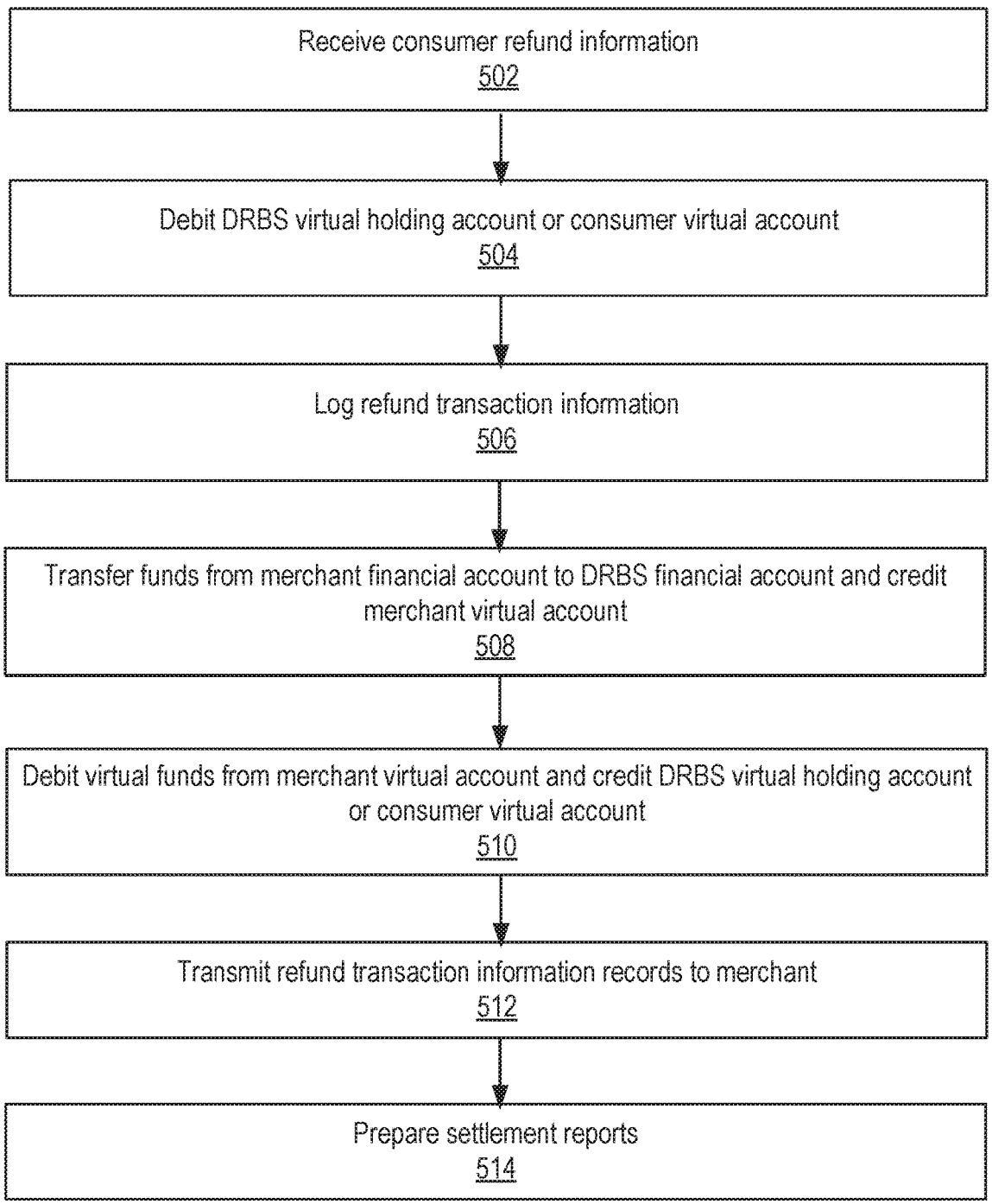
FIG. 5 provides a flow chart of an example method associated with processing customer refunds, in accordance with an embodiment of the present disclosure.

In various scenarios, payments may have to be returned or refunded to one or more consumers for various reasons. FIG. 5 provides a flow chart of an example method 500 associated with processing consumer refunds. At block 502, consumer refund information is received, representing a credit to a consumer's payment card (such as the payment card 106 of FIG. 1). At block 504, a DRBS virtual holding account or a consumer virtual account is debited based on the consumer refund information. At block 506, refund transaction information is logged in a returns file. At block 508, funds are transferred from a merchant financial account to a DRBS financial account. This funds transfer may be carried out, for example, using an ACH transaction. The ACH transaction produces a debit to the merchant's financial account and a credit to the DRBS's virtual account on the DRBS. At block 510, virtual funds are debited from the merchant's virtual account and credited to the DRBS virtual holding account or the consumer virtual account to offset the debit that occurred in block 504. Similar to the aggregation of consumer payments over a settlement period discussed above, consumer refunds may be aggregated over a settlement period. For example, the returns file can keep track of return information for a merchant such that a total refund balance can be tracked and settled at the end of a settlement period. In another embodiment, the merchant virtual holding account can be debited for each refund, such that the merchant virtual holding account represents an aggregated refund balance. In this scenario, it may be the case that debiting of the merchant virtual account (and associated crediting of the DRBS virtual holding account or consumer virtual account) occurs before the ACH transaction is initiated. At block 512, refund transaction information is transmitted to the merchant for the merchant's records. At block 514, settlement reports can be prepared for the DRBS's records and to assist the merchant with payment returns reconciliation.

In certain embodiments, merchant payment processes can be separated from merchant consumer refund processes. For example, a merchant payment virtual account and a merchant consumer refund virtual account can be established for a single merchant, such that merchant payments and consumer refunds are handled separately. The merchant payment virtual account aggregates all payments made to the merchant over a settlement period, and a first ACH transaction transmits the value of the aggregated payments to the merchant at the end of the settlement period. The merchant consumer refund virtual account aggregates all consumer refunds owed by the merchant, and a second ACH transaction transmits the value of the aggregated consumer refunds from the merchant financial account to the DRBS financial account at the end of the settlement period. In an alternative embodiment, one or more of the merchant payment processes described above and the merchant consumer refund process can be combined and handled using a single merchant virtual account on the DRBS. For example, the merchant's virtual account balance can represent a net value of all payments made to the merchant and all refunds owed by the merchant. At the end of a given settlement period, the total value of all payments to the merchant and all refunds owed by the merchant can be combined into a single value resulting in a single ACH transaction. If, at the end of a settlement period, the value of the payments is greater than that of the refunds, then a single ACH transaction transmits funds to the merchant's financial account, and if the refunds are greater than the payments, then a single ACH transaction transfers funds from the merchant financial account to the DRBS's merchant virtual account.

It should be understood that while many of the examples above discuss aggregation of payments or refunds for a particular "merchant," aggregation may be performed at any scale. For example, as discussed above, the aggregation of payments and/or refunds for a particular merchant may be broken up into multiple batches based on merchant preferences. For example, rather than aggregating all payments and/or all refunds for a particular merchant into a single ACH transaction, payments and/or refunds can be aggregated based on a merchant's grouping preferences, e.g., for a single line of business, or for a single customer grouping defined by the merchant.

Payments Using Electronic Gift Cards

Many of the systems and methods described above have dealt with a scenario in which a consumer is making a purchase from a merchant. These examples have made reference to funds being transferred between a consumer financial account, a merchant financial account, and a DRBS financial account, and virtual funds being transferred between a merchant virtual account, a DRBS virtual holding account, and a consumer virtual account. However, in various embodiments, digital payment tokens may be generated in the form of electronic gift cards supplied by an electronic gift card vendor (i.e., an eGift vendor). In these embodiments, when a consumer makes a purchase transaction with a merchant, the DRBS can be configured to pull funds from an external consumer financial account (e.g., using consumer payment card information) associated with a consumer, credit the funds virtually to a consumer virtual account or DRBS virtual holding account, transfer the credited, virtual funds to an eGift vendor virtual account associated with an eGift vendor, and then transfer actual funds to an eGift vendor financial account associated with the eGift vendor. The eGift vendor then provides an electronic gift card that the consumer can use to complete his or her purchase with the merchant. In the system 100 shown in FIG. 1, the eGift vendor can essentially be considered another merchant. A purchase transaction is essentially completed between the consumer and the eGift vendor, but the purchase transaction allows the consumer to complete another purchase transaction with a merchant using an electronic gift card provided by the eGift vendor. Consider an example scenario in which a consumer is at merchant A and wishes to make a purchase transaction for $702.16. Rather than paying the merchant $702.16, the consumer's payment can be directed to an eGift vendor, who then generates an electronic gift card in the amount of $702.16 that can be used with the merchant. The electronic gift card is then used to complete the purchase transaction between the consumer and the merchant. The specific mechanisms and procedures utilized to carry out this transaction are described in greater detail below with reference to FIGS. 6A and 6B.

Figure 6A:
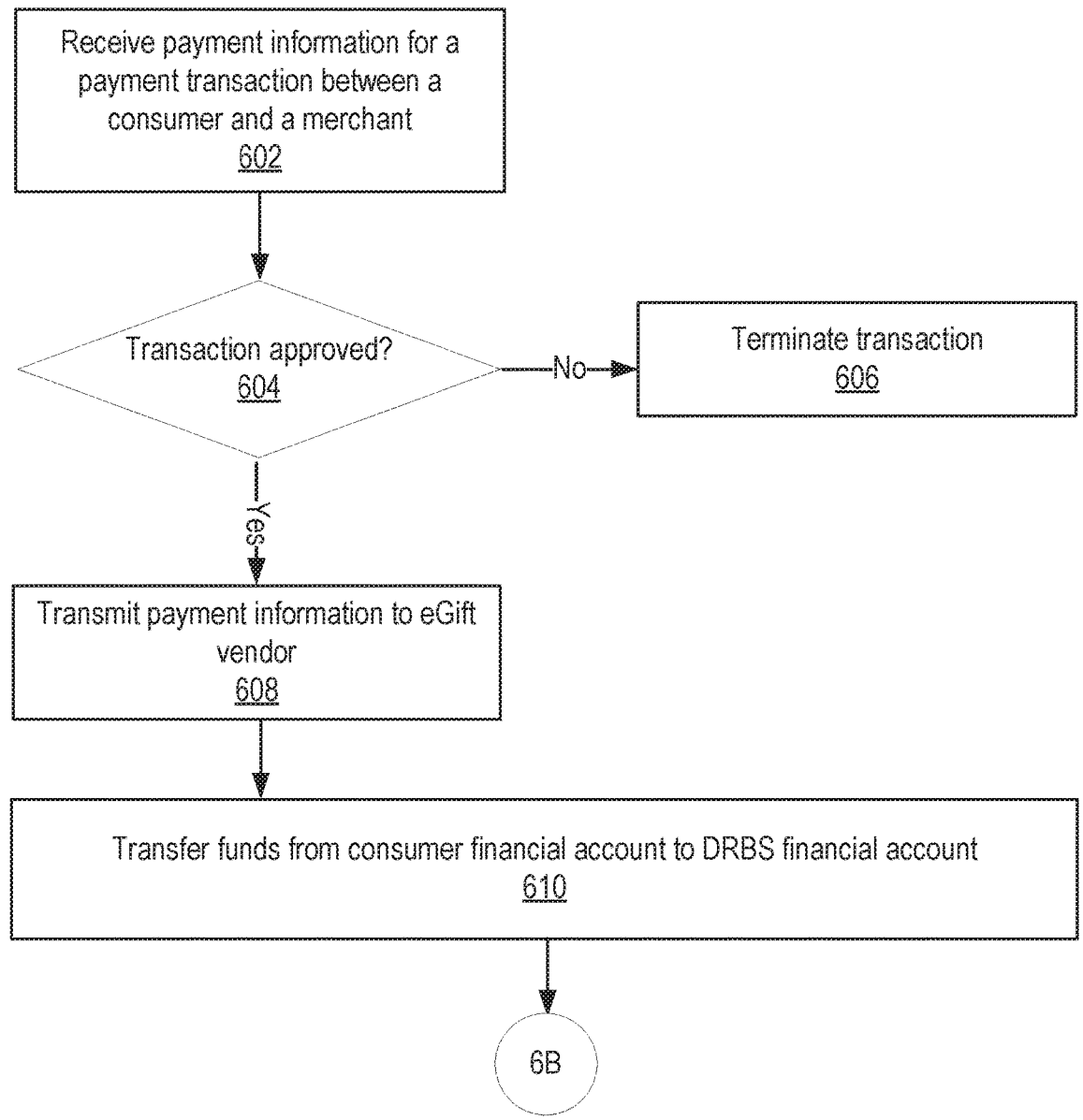
FIGS. 6A and 6B provide a flow chart of an example method associated with processing a payment using an electronic gift card, in accordance with an embodiment of the present disclosure.
Figure 6B:
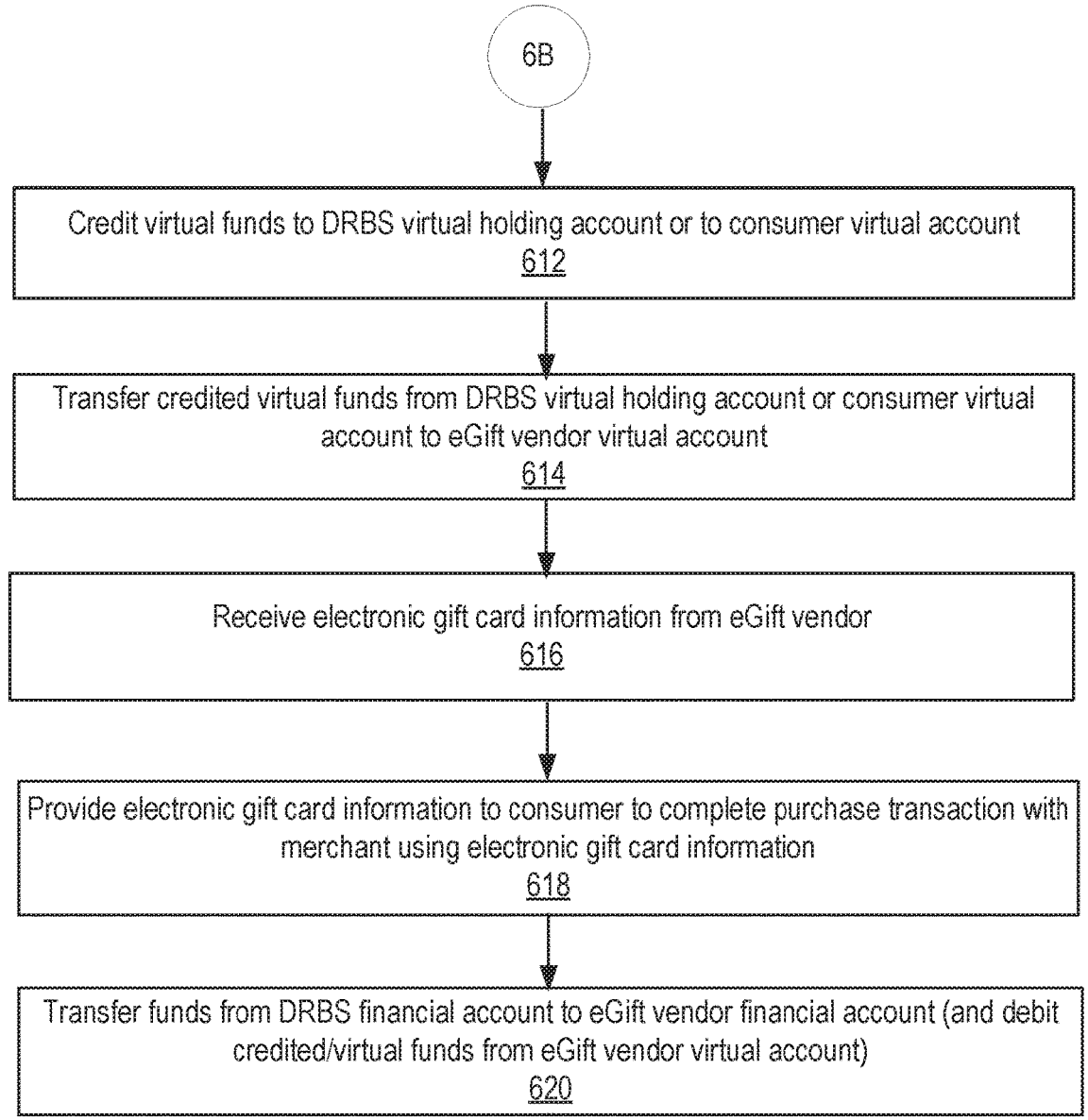

FIGS. 6A-B provide a flowchart of an exemplary electronic gift card purchase transaction processing method 600, according to an embodiment of the present disclosure. The example method 600 is associated with processing a payment transaction between a consumer and a merchant using an electronic gift card issued by an eGift vendor. At block 602, payment information is received for a payment transaction between a consumer and a merchant. As discussed above, payment information can include, for example, consumer identifying information (e.g., name, address, user ID, account number, etc.) and payment card information (e.g., card number, billing address, security code, etc.). Payment information can also include any other relevant payment information, such as payment amount, and merchant identifying information (which can be utilized by the DRBS and/or the eGift vendor to identify who the merchant is). In certain embodiments, payment information can include selection of one or more stored payment methods, as described in greater detail herein.

At block 604, a determination is made as to whether or not the transaction is approved (similar to block 204 of FIG. 2). If the transaction is not approved, the transaction is terminated (block 606). If the transaction is approved, payment information is transmitted to the eGift vendor (block 608). At block 610, funds are transferred from the consumer financial account (e.g., at the issuing bank) to a DRBS financial account (e.g., at the DRBS's bank).

The example method 600 is continued in FIG. 6B. Once the funds transfer to the DRBS's financial account has been initiated, a virtual account on the DRBS can be virtually credited with those funds. For example, virtual funds can be credited to a DRBS virtual holding account or a consumer virtual account (block 612). At block 614, the credited, virtual funds are transferred from the DRBS virtual holding account or the consumer virtual account to an eGift vendor virtual account on the DRBS associated with the eGift vendor. Electronic gift card information is then received from the eGift vendor (block 616). At block 618, electronic gift card information is provided to the consumer so that the consumer can use the electronic gift card information to complete the purchase transaction with the merchant. At block 620, funds are transferred from the DRBS financial account to an eGift vendor financial account, and virtual funds are debited from the eGift vendor virtual account accordingly. It should be appreciated that any of the systems and methods discussed above with reference to merchants (e.g., processing payments using stored payment methods, processing batch payments, processing returns) are equally applicable to electronic gift card purchases from an eGift vendor.

Definitions, Terms, and Reservation of Rights

Figure 7:
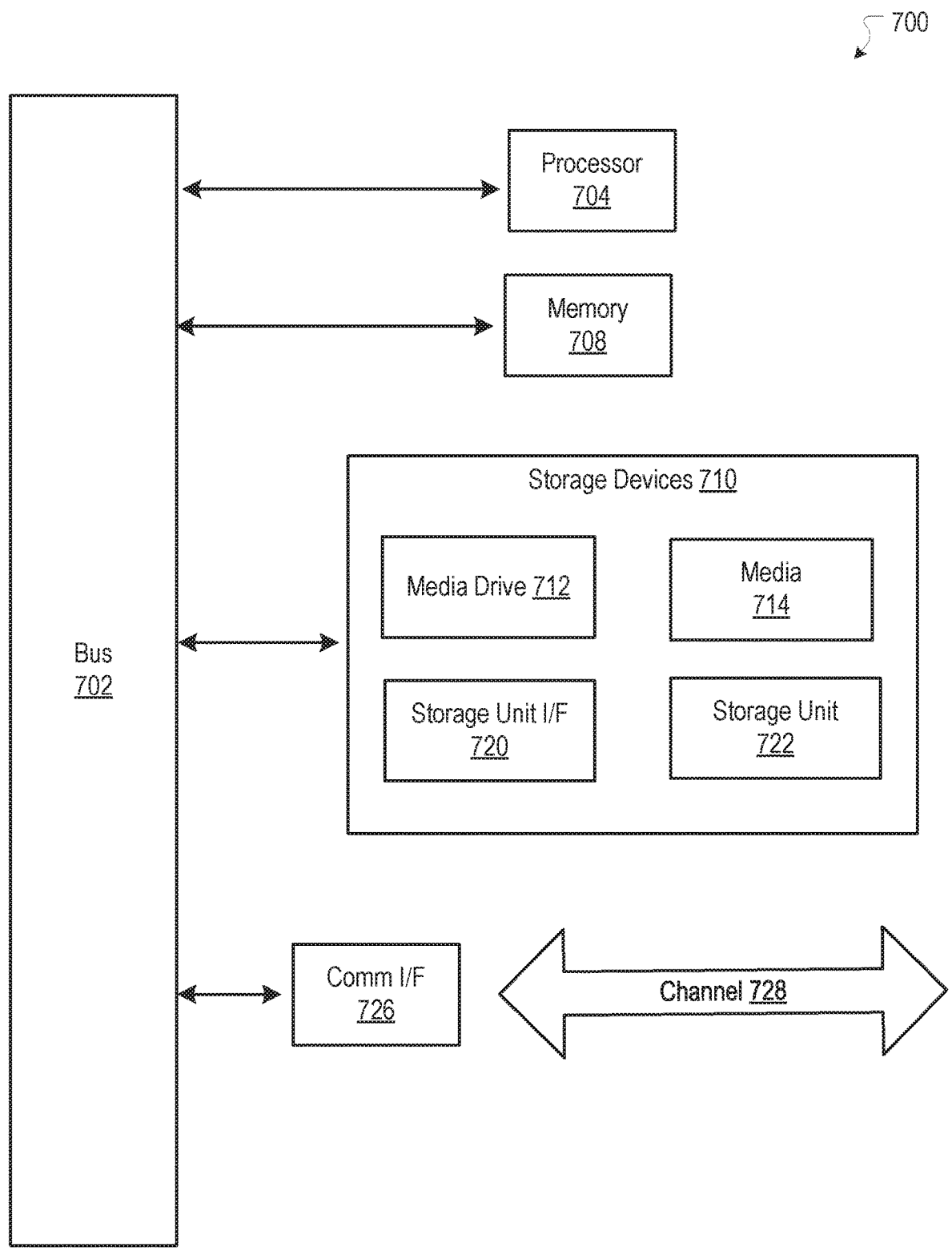
FIG. 7 illustrates a sample computing module that may be used to implement certain features and embodiments of the present disclosure.

As used herein, the term set may refer to any collection of elements, whether finite or infinite. The term subset may refer to any collection of elements, wherein the elements are taken from a parent set; a subset may be the entire parent set. The term proper subset refers to a subset containing fewer elements than the parent set. The term sequence may refer to an ordered set or subset. The terms less than, less than or equal to, greater than, and greater than or equal to, may be used herein to describe the relations between various objects or members of ordered sets or sequences; these terms will be understood to refer to any appropriate ordering relation applicable to the objects being ordered.

Where components or modules of the technology are implemented in whole or in part using software, in one embodiment, these software elements can be implemented to operate with a computing or processing module capable of carrying out the functionality described with respect thereto. One such example computing module is shown in FIG. 7. Various embodiments are described in terms of this example-computing module 700. After reading this description, it will become apparent to a person skilled in the relevant art how to implement the technology using other computing modules or architectures.

Referring now to FIG. 7, computing module 700 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 700 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 700 might include, for example, one or more processors, controllers, control modules, or other processing devices, such as a processor 704. Processor 704 might be implemented using a general-purpose or special-purpose processing engine such as, for example, a microprocessor, controller, or other control logic. In the illustrated example, processor 704 is connected to a bus 702, although any communication medium can be used to facilitate interaction with other components of computing module 700 or to communicate externally.

Computing module 700 might also include one or more memory modules, simply referred to herein as main memory 708. For example, preferably random access memory (RAM) or other dynamic memory, might be used for storing information and instructions to be executed by processor 704. Main memory 708 might also be used for storing temporary variables or other intermediate information during execution of instructions to be executed by processor 704. Computing module 700 might likewise include a read only memory ("ROM") or other static storage device coupled to bus 702 for storing static information and instructions for processor 704.

The computing module 700 might also include one or more various forms of information storage devices 710, which might include, for example, a media drive 712 and a storage unit interface 720. The media drive 712 might include a drive or other mechanism to support fixed or removable storage media 714. For example, a hard disk drive, a floppy disk drive, a magnetic tape drive, an optical disk drive, a CD or DVD drive (R or RW), or other removable or fixed media drive might be provided. Accordingly, storage media 714 might include, for example, a hard disk, a floppy disk, magnetic tape, cartridge, optical disk, a CD or DVD, or other fixed or removable medium that is read by, written to or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing module 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory module) and memory slot, a PCMCIA slot and card, and other fixed or removable storage units 722 and interfaces 720 that allow software and data to be transferred from the storage unit 722 to computing module 700.

Computing module 700 might also include a communications interface 724. Communications interface 724 might be used to allow software and data to be transferred between computing module 700 and external devices. Examples of communications interface 724 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 724 might typically be carried on signals, which can be electronic, electromagnetic (which includes optical) or other signals capable of being exchanged by a given communications interface 724. These signals might be provided to communications interface 724 via a channel 728. This channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 708, storage unit 720, media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 700 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Although the disclosure has been presented with reference only to the presently preferred embodiments, those of ordinary skill in the art will appreciate that various modifications can be made without departing from this disclosure. As such, the disclosure is defined only by the following claims and recited limitations.

The invention claimed is:

1. An event-triggered distributed rules-based system ("DRBS") comprising:
    a plurality of virtual accounts, including:
        a virtual financial account associated with a consumer user, and
        a virtual merchant account associated with a merchant user, the merchant user being a member of the DRBS;
    a database configured to manage virtual balance information for the plurality of virtual accounts, and
    a processor of the DRBS, wherein the processor of the DRBS is configured to:
        determine a consumer user account number associated with the consumer user, the consumer user account number being issued by an issuer bank and corresponding to a consumer user account maintained by the issuer bank,
        determine a virtual financial account number associated with the consumer user, the virtual financial account number being issued by the DRBS and corresponding to the virtual financial account associated with the consumer user,
        determine the consumer user account number during a payment transaction with the merchant user,
        contact the issuer bank via a payment network to determine that the payment transaction has been authorized and a transaction amount for the payment transaction,
        receive an authorization confirmation for the transaction amount from the issuer bank via the payment network,
        determine the virtual merchant account associated with the payment transaction, wherein the virtual merchant account is associated with the merchant user involved in the payment transaction, transfer the transaction amount from the consumer user account to the virtual financial account associated with the consumer user, transfer the transaction amount from the virtual financial account associated with the consumer user to the virtual merchant account associated with the merchant user through the DRBS, during a settlement period, continuously update the virtual merchant account associated with the merchant user with other payment transactions involving the merchant user, after the settlement period closes, aggregate funds transferred to the virtual merchant account associated with the merchant user to a single transaction amount, and transfer the single transaction amount from the virtual merchant account to a merchant financial account associated with the merchant user and maintained by an acquirer bank, wherein the single transaction amount is transferred via an ACH transaction to the merchant financial account.

2. The DRBS of claim 1, wherein the processor of the DRBS is further configured to transfer the single transaction amount to the merchant financial account after the close of the settlement period.

3. The DRBS of claim 1, wherein the processor of the DRBS is further configured to transfer the transaction amount from the virtual financial account associated with the consumer user to the virtual merchant account associated with the merchant user by instructing a transaction processor to update the virtual balance information in the database.

4. The DRBS of claim 1, wherein the processor of the DRBS is further configured to debit the single transaction amount from the virtual merchant account associated with the merchant user in conjunction with transferring the single transaction amount to the merchant financial account.

5. The DRBS of claim 1, wherein the processor of the DRBS is further configured to:
aggregate a plurality of payment funds associated with a plurality of payments received by the merchant user from a plurality of payment transactions occurring during the settlement period; and
transfer the plurality of payment funds aggregated over the settlement period to the merchant financial account after the settlement period has closed.

6. The DRBS of claim 1, wherein the processor of the DRBS is further configured to:
receive a secure token associated with a stored payment method, and
transmit the secure token to a payment processor.

7. The DRBS of claim 1, wherein the processor of the DRBS is further configured to:
receive consumer refund information,
credit the virtual financial account associated with the consumer user based on the consumer refund information,
debit the virtual merchant account based on the consumer refund information, and
receive funds from the merchant financial account into the virtual merchant account maintained by the DRBS based on the debiting of the virtual merchant account.

8. The DRBS of claim 1, wherein funds are received from the virtual financial account associated with the consumer user via a Visa Direct Account Funding Transaction (AFT) process.

9. The DRBS of claim 1, wherein the processor of the DRBS is further configured to:
receive a recurring payments file containing a plurality of recurring payment transactions, each of the plurality of recurring payment transactions comprising payment information and associated with the consumer user;
for each recurring payment transaction of the plurality of recurring payment transactions:
receive funds for the recurring payment transaction from the consumer user account,
credit virtual funds to the virtual financial account associated with the consumer user, and
transfer the virtual funds from the virtual financial account associated with the consumer user to the virtual merchant account maintained by the DRBS; and
transfer the funds to the merchant financial account associated with the merchant user in a second single transaction.

10. The DRBS of claim 9, wherein the processor of the DRBS is further configured to:
aggregate the virtual funds transferred to the virtual merchant account maintained by the DRBS from the plurality of recurring payment transactions, and
transfer the aggregated funds from the plurality of recurring payment transactions to the merchant financial account in a second ACH transaction.

11. A method performed by an event-triggered distributed rules-based system ("DRBS"), the method comprising:
determining, by a processor of the DRBS, a consumer user account number associated with a consumer user, the consumer user account number being issued by an issuer bank and corresponding to a consumer user account maintained by the issuer bank;
determining a virtual financial account number associated with the consumer user, the virtual financial account number being issued by the DRBS and corresponding to a virtual financial account associated with the consumer user;
determining the consumer user account number during a payment transaction with a merchant user;
contacting the issuer bank via the payment network to determine that the payment transaction has been authorized and a transaction amount for the payment transaction;
receiving an authorization confirmation for the transaction amount from the issuer bank via the payment network,
determining a virtual merchant account associated with the payment transaction, wherein the virtual merchant account is associated with the merchant user involved in the payment transaction;
transferring the transaction amount from the consumer user account to the virtual financial account associated with the consumer user;
transferring the transaction amount from the virtual financial account associated with the consumer user to the virtual merchant account associated with the merchant user through the DRBS;
during a settlement period, continuously updating the virtual merchant account associated with the merchant user with other payment transactions involving the merchant user;
after the settlement period closes, aggregating funds transferred to the virtual merchant account associated with the merchant user to a single transaction amount; and transferring the single transaction amount from the virtual merchant account to a merchant financial account associated with the merchant user and maintained by an acquirer bank, wherein the single transaction amount is transferred via an ACH transaction to the merchant financial account.

12. The method of claim 11, wherein the transferring the single transaction amount to the merchant financial account is performed after the close of the settlement period.

13. The method of claim 11, wherein the transferring the transaction amount from the virtual financial account associated with the consumer user to the virtual merchant account associated with the merchant user are performed by updating a database of virtual account balances.

14. The method of claim 11, further comprising:
receiving a secure token associated with a stored payment method, and
transmitting the secure token to a payment processor.

15. The method of claim 11, further comprising:
receiving consumer refund information;
debiting the virtual merchant account based on the consumer refund information;
receiving funds from the merchant financial account based on the debiting of the virtual merchant account; and
crediting the virtual merchant account in response to the receiving the funds from the merchant financial account.

16. The method of claim 11, further comprising:
receiving a recurring payments file containing a plurality of recurring payment transactions, each recurring payment transaction associated with payment information and the consumer user, and
for each recurring payment transaction of the plurality of recurring payment transactions:
receiving funds for the recurring payment transaction,
crediting virtual funds to the virtual financial account,
transferring the virtual funds from the virtual financial account associated with the consumer user to the virtual merchant account maintained by the DRBS, and
transferring the funds to the merchant financial account associated with the merchant user.

17. The method of claim 16, further comprising:
aggregating the funds from the plurality of recurring payment transactions, and
transferring the aggregated funds from the plurality of recurring payment transactions to the merchant financial account in a second ACH transaction.

18. The method of claim 11, further comprising:
upon receiving an indication that the payment transaction has been approved, transmitting a success code to the merchant user.

19. The method of claim 11, further comprising:
generating a settlement report; and
transmitting the settlement report to the merchant user.

* * * * *